H. STEVENS.
Hen's Nest.

No. 54,974. Patented May 22, 1866.

UNITED STATES PATENT OFFICE.

HIRAM STEVENS, OF NEW HAVEN, CONNECTICUT.

IMPROVEMENT IN HENS' NESTS.

Specification forming part of Letters Patent No. 54,974, dated May 22, 1866.

*To all whom it may concern:*

Be it known that I, HIRAM STEVENS, of New Haven, in the county of New Haven and State of Connecticut, have invented a new and useful Improvement in Boxes for Hens' Nests; and I do hereby declare the following, when taken in connection with the accompanying drawings and the letters of reference marked thereon, to be a full, clear, and exact description of the same, and which said drawings constitute part of this specification, and represent, in—

Figure 1:
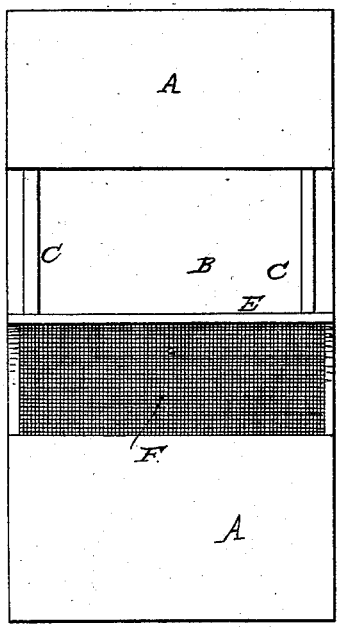
Figure 2:
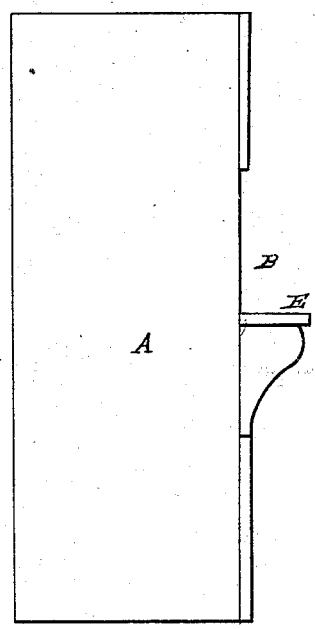
Figure 3:
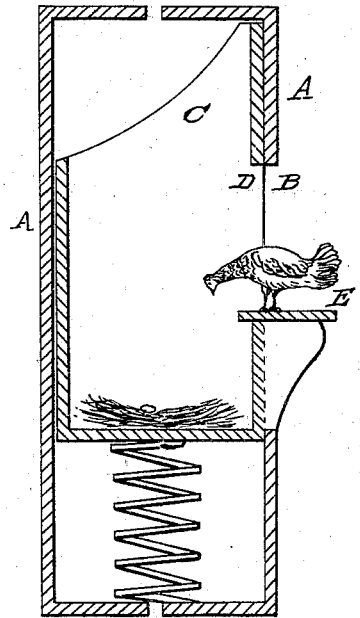

Figure 1, a front view; Fig. 2, a side view; Fig. 3, the nest as open for the admission of the hen, and in Fig. 4 the nest as closed while the hen is on the nest, the last two being sectional views.

The object of my invention is to construct a nest for fowls which shall be self-closing when the fowl enters and open when she leaves, for the purpose of preventing the entrance of other fowls while the nest is occupied; and that others may be enabled to construct my invention, in which this object is fully attained, I will proceed to fully describe the same as illustrated in the accompanying drawings.

A is an outer case, having an opening, B, upon one side. Within the case A, I place a box, C, fitted so as to slide freely up and down, as from the position in Fig. 3 to Fig. 4. The inner box is provided with an opening, D, which, when the box is up, as in Fig. 3, corresponds to the opening B. That part of the inner box above the said opening when the box is down, as in Fig. 4, nearly or quite closes the opening B in the outer box.

E is a platform across the opening for the convenience of the fowl. Beneath the inner box I place a spring to raise and support the box when not occupied. Other devices, as weights, &c., may be employed for this purpose.

Figure 4:
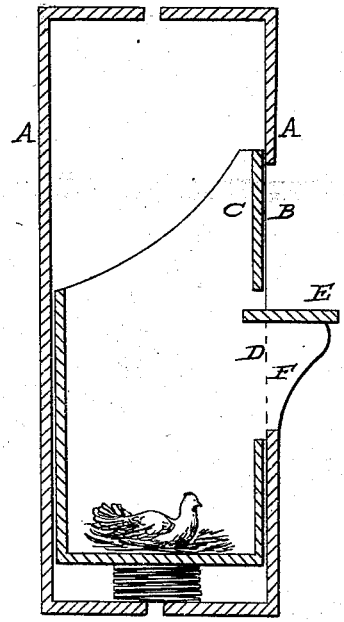

When the fowl enters the nest her weight causes the inner box to slowly drop to the position seen in Fig. 4, nearly closing the opening by which she entered, so that no other fowl may enter while she occupies the nest.

The nest may be ventilated by openings in the upper part, or the front may be open, protected by a netting, as seen at F, Figs. 1 and 4.

When the fowl desires to leave the nest she will naturally seek the opening through which she entered. The platform E extends into the box sufficiently to form a perch upon which she may jump to seek her exit. Standing thereon, the box rises and opens for her exit, or a perch within and independent of the inner box, upon which she would naturally jump, will answer the purpose.

Several such arranged boxes may be placed within one case where numerous nests are required.

Having thus fully described my invention, what I claim as new and useful, and desire to secure by Letters Patent, is—

The construction and arrangement of the box C within a case, A, so as to operate substantially in the manner specified.

HIRAM STEVENS.

Witnesses:
JOHN E. EARLE,
JOHN H. SHUMWAY.